(12) United States Patent
Kim et al.

(10) Patent No.: US 9,158,147 B2
(45) Date of Patent: Oct. 13, 2015

(54) IN-PLANE SWITCHING MODE LIQUID CRYSTAL DISPLAY DEVICE

(75) Inventors: Jong-Woo Kim, Paju (KR); Chang-Ho Oh, Seoul (KR); Won-Hyung Yoo, Seoul (KR); Sang-Yoon Paik, Paju (KR); Jun-Ki Kang, Paju (KR)

(73) Assignee: LG Display Co., Ltd., Seoul (KR)

( * ) Notice: Subject to any disclaimer, the term of this patent is extended or adjusted under 35 U.S.C. 154(b) by 500 days.

(21) Appl. No.: 13/565,534

(22) Filed: Aug. 2, 2012

(65) Prior Publication Data

US 2013/0033654 A1 Feb. 7, 2013

(30) Foreign Application Priority Data

Aug. 4, 2011 (KR) ........................ 10-2011-0077906

(51) Int. Cl.
*G02F 1/1335* (2006.01)
*G02F 1/1362* (2006.01)
*G02F 1/1339* (2006.01)
*G02F 1/1343* (2006.01)

(52) U.S. Cl.
CPC ...... *G02F 1/133509* (2013.01); *G02F 1/13394* (2013.01); *G02F 1/134363* (2013.01); *G02F 1/136209* (2013.01); *G02F 1/136286* (2013.01)

(58) Field of Classification Search
CPC .............................................. G02F 1/134363
USPC ....................................................... 349/141
See application file for complete search history.

(56) References Cited

U.S. PATENT DOCUMENTS

| | | | |
|---|---|---|---|
| 2005/0253984 A1* | 11/2005 | Kim et al. ...................... | 349/106 |
| 2006/0001803 A1* | 1/2006 | Park ............................... | 349/113 |
| 2006/0256249 A1* | 11/2006 | Nagano et al. .................. | 349/43 |
| 2007/0242203 A1 | 10/2007 | Lee et al. | |
| 2007/0296901 A1* | 12/2007 | Seo et al. ....................... | 349/141 |

(Continued)

FOREIGN PATENT DOCUMENTS

| CN | 1677207 A | 10/2005 |
|---|---|---|
| CN | 1716061 A | 1/2006 |

(Continued)

OTHER PUBLICATIONS

State Intellectual Property Office of the People's Republic of China, First Office Action, Chinese Patent Application No. 201210275558.1, Aug. 4, 2014, sixteen pages.

(Continued)

*Primary Examiner* — Nathanael R Briggs
*Assistant Examiner* — Alexander Gross
(74) *Attorney, Agent, or Firm* — Fenwick & West LLP (57) ABSTRACT

A liquid crystal display device includes first and second substrates and a liquid crystal layer interposed therebetween; a gate line, a data line and a common line over the first substrate in the display area; a thin film transistor connected to the gate line and the data line; a color filter layer over the thin film transistor; a first passivation layer over the color filter layer; an auxiliary common line, inner common electrodes and pixel electrodes over the first passivation layer, wherein the auxiliary common line includes a vertical portion and a horizontal portion, the inner common electrodes extend from the horizontal portion, and the pixel electrodes alternate the inner common electrodes; a light blocking pattern in the non-display area, wherein the light blocking pattern includes the same materials as the color filter layer.

15 Claims, 7 Drawing Sheets

(56) References Cited

U.S. PATENT DOCUMENTS

| | | | |
|---|---|---|---|
| 2009/0207371 A1* | 8/2009 | Yamamoto et al. | 349/156 |
| 2009/0268145 A1* | 10/2009 | Anjo et al. | 349/141 |
| 2011/0134348 A1* | 6/2011 | Morishita et al. | 349/33 |
| 2011/0141427 A1* | 6/2011 | Jung et al. | 349/153 |

FOREIGN PATENT DOCUMENTS

| | | |
|---|---|---|
| JP | H08-146402 A | 6/1996 |
| JP | 2005-284291 A | 10/2005 |
| JP | 2006-018276 A | 1/2006 |
| JP | 2007-286592 A | 11/2007 |
| JP | 2009-109658 A | 5/2009 |

OTHER PUBLICATIONS

Japanese Patent Office, Office Action, Japanese Patent Application No. 2012-172980, Apr. 15, 2014, four pages [with concise explanation of relevancy in English].

* cited by examiner

IN-PLANE SWITCHING MODE LIQUID CRYSTAL DISPLAY DEVICE

This application claims the benefit of priority to Korean Patent Application No. 10-2011-0077906 filed in Korea on Aug. 4, 2011, which is hereby incorporated by reference for all purposes as if fully set forth herein.

BACKGROUND OF THE INVENTION

1. Field of Invention

The invention relates to a liquid crystal display device, and more particularly, to an in-plane switching mode liquid crystal display device having an improved aperture ratio and a method of fabricating the same.

2. Discussion of Related Art

Recently, liquid crystal display devices have been spotlighted as next generation advanced technology display devices because of their low consumption in power, high portability, and high added value.

Generally, a liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules.

In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling the light transmittance of the liquid crystal material.

The LCD device includes thin film transistors as a switching element, referred to as an active matrix LCD (AM-LCD) device. Therefore, the LCD device has excellent characteristics of high resolution and displaying moving images, the AM-LCD device has been widely used.

The AM-LCD device includes an array substrate, a color filter substrate and a liquid crystal layer interposed therebetween. The array substrate may include a pixel electrode and thin film transistor, and the color filter substrate may include a color filter layer and a common electrode. The AM-LCD device is driven by an electric field between the pixel electrode and the common electrode to have excellent properties of transmittance and aperture ratio. However, since the AM-LCD device uses a vertical electric field that is perpendicular to the substrates, the AM-LCD device has poor viewing angles.

An LCD device having a wide viewing angle property has been suggested and developed to resolve the above-mentioned limitations.

Figure 1:
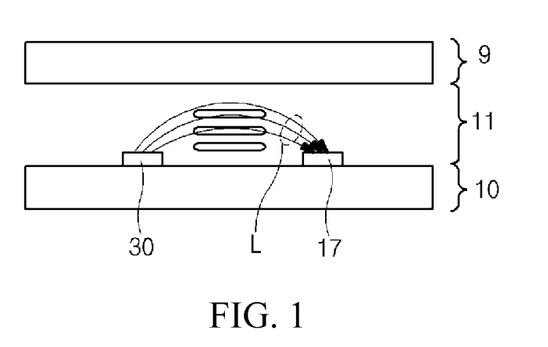
FIG. 1 is a cross-sectional view of a related art IPS mode LCD device.

FIG. 1 is a cross-sectional view of a related art in-plane switching (IPS) mode LCD device. As shown in FIG. 1, the related art IPS mode LCD device includes an upper substrate 9 and a lower substrate 10 spaced apart from and facing each other. A liquid crystal layer 11 is interposed between the upper and lower substrates 9 and 10. A common electrode 17 and a pixel electrode 30 are formed on the lower substrate 10. The common electrode 17 and the pixel electrode 30 may be disposed on the same level. Liquid crystal molecules of the liquid crystal layer 11 are driven by a horizontal electric field L, which is induced between the common and pixel electrodes 17 and 30.

Figure 2A:
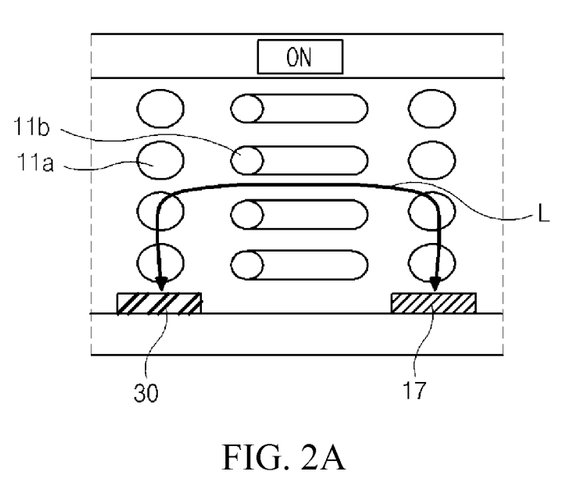
FIGS. 2A and 2B are cross-sectional views showing turned on state and turned off state, respectively, of a related art IPS mode LCD device.
Figure 2B:
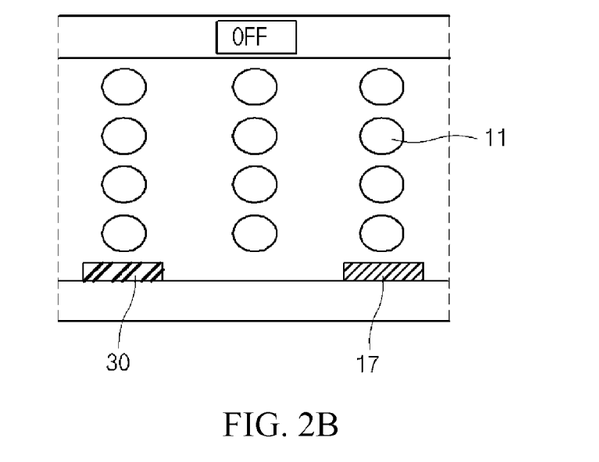

FIGS. 2A and 2B are cross-sectional views showing turned on state and turned off state, respectively, of a related art IPS mode LCD device. FIG. 2A shows arrangement of liquid crystal molecules in on state, when the voltage is applied to the IPS mode LCD device, arrangement of liquid crystal molecules 11a above the common electrode 17 and the pixel electrode 30 is unchanged. However, liquid crystal molecules 11b between the common electrode 17 and the pixel electrode 30 are horizontally arranged due to the horizontal electric field L. Since the liquid crystal molecules 11b are arranged by the horizontal electric field L, the IPS mode LCD device has a wide viewing angle property. For example, the IPS mode LCD device has a viewing angle of about 80 degrees to about 89 degrees up and down and right and left without an image inversion or a color inversion.

FIG. 2B shows the state where the voltage is not applied to the IPS mode LCD device. Because an electric field is not induced between the common and pixel electrodes 17 and 30, the arrangement of liquid crystal molecules 11 of the liquid crystal layer is not changed.

Figure 3:
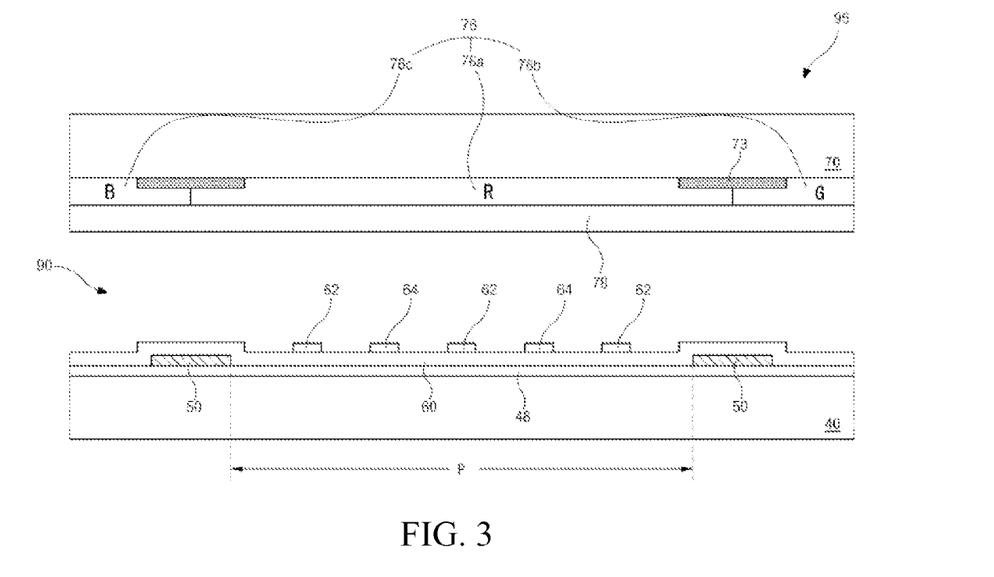
FIG. 3 is a cross-sectional view schematically illustrating a pixel region of a related art IPS mode LCD device.

FIG. 3 is a cross-sectional view schematically illustrating a pixel region of a related art IPS mode LCD device. As shown in FIG. 3, the related art IPS mode LCD device 95 includes an array substrate 40, a color filter substrate 70, and a liquid crystal layer 90 interposed between the substrates 40 and 70.

The array substrate 40 includes gate lines (not shown) formed along a horizontal direction, common lines (not shown) parallel to the gate lines, and data lines 50 intersecting the gate and common lines (not shown). A gate insulating layer 48 is disposed between the data line 50 and the gate and common lines. The gate lines and the data lines 50 define pixel regions P.

A thin film transistor (not shown) is formed in each pixel region P and includes a gate electrode (not shown), a semiconductor layer (not shown), and source and drain electrodes (not shown). A passivation layer 60 covers the thin film transistor (not shown).

A plurality of pixel electrodes 64 and a plurality of common electrodes 62 are formed in the pixel region P on the passivation layer 60. The pixel electrodes 64 are electrically connected to the drain electrode (not shown) of the thin film transistor (not shown) through a drain contact hole (not shown), which exposes the drain electrode (not shown). The common electrodes 62 are connected to the common line (not shown) through a common contact hole (not shown). The pixel electrodes 64 and the common electrodes 62 each have a bar shape and alternate each other.

Here, the pixel electrodes 64 and the common electrodes 62 on the passivation layer 48 have a single layered structure of a transparent conductive material or an opaque metallic material.

The color filter substrate 70 corresponding to the array substrate 40 includes a black matrix 73 having an opening corresponding to the pixel region P and a color filter layer 76 in the opening of the black matrix 73. The color filter layer 76 includes red (R), green (G) and blue (B) color filter patterns 76a, 76b, and 76c that are sequentially repeated.

An overcoat layer 78 covers the color filter layer 76. A gap-forming spacer (not shown) having a first height and a press-preventing spacer (not shown) having a second height are formed at a border of the pixel region P. The second height is lower than the first height.

In the IPS mode LCD device 95, when the array substrate 40 and the color filter substrate 70 are attached, there may be misalignment. Therefore, to prevent light leakage, the black matrix should have a wider width due to an alignment margin between the array substrate 40 and the color filter substrate 70. Accordingly, the aperture ratio is lowered.

SUMMARY OF THE INVENTION

Accordingly, the present invention is directed to an IPS mode LCD device that substantially obviates one or more of the problems due to limitations and disadvantages of the related art.

An object of the present invention is to provide an IPS mode LCD device that improves the aperture ratio and transmittance and reduces manufacturing costs.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes first and second substrates facing each other, wherein a display area and a non-display area are defined on the first and second substrates, and a liquid crystal layer is interposed between the first and second substrates; a gate line, a data line and a common line over an inner surface of the first substrate in the display area, wherein the gate line and the data line intersect each other to define a pixel region, and the common line is parallel to the gate line; a thin film transistor at the pixel region and connected to the gate line and the data line; a color filter layer over the thin film transistor all over the display area; a first passivation layer of photo acryl over the color filter layer; an auxiliary common line, inner common electrodes and pixel electrodes over the first passivation layer, wherein the auxiliary common line includes a vertical portion overlapping the data line and a horizontal portion overlapping the gate line and the common line and has a lattice structure, the inner common electrodes extend from the horizontal portion in the pixel region and have a bar shape, and the pixel electrodes alternate the inner common electrodes and have a bar shape; a light blocking pattern in the non-display area and surrounding the display area, wherein the light blocking pattern includes the same materials as the color filter layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 4:
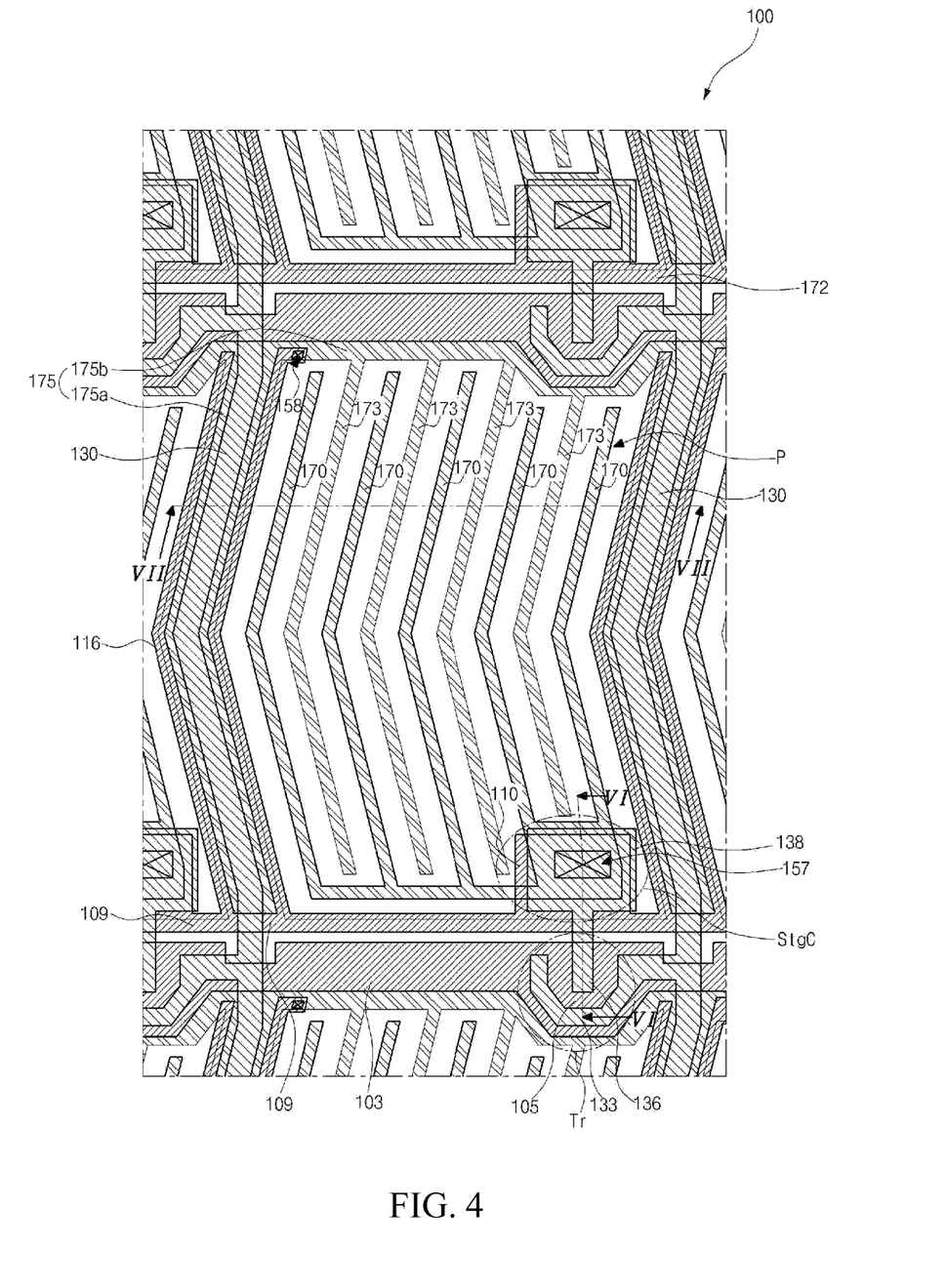
FIG. 4 is a plan view of schematic illustrating a pixel region of an IPS mode LCD device according to an embodiment of the invention.

FIG. 4 is a plan view of schematic illustrating a pixel region of an in-plane switching (IPS) mode liquid crystal display (LCD) device according to an embodiment of the invention. In FIG. 4, the LCD device 100 includes, among other components, an array substrate (not shown), an opposite substrate (not shown), and a liquid crystal layer (not shown) interposed between the array substrate and the opposite substrate. The array substrate includes pixel electrodes 170, common electrodes 173 and a color filter layer (not shown). The opposite substrate includes a first spacer (not shown) for forming a cell gap and a second spacer for preventing press.

In the array substrate, gate lines 103 and data lines 130 are formed on a transparent insulating substrate (not show), and a gate insulating layer (not shown) is formed between the gate lines 103 and the data lines 130. The transparent insulating substrate functions as a base and is formed of glass or plastic. The gate lines 103 may extend along a horizontal direction, and the data lines 130 may extend along a vertical direction. The gate lines 103 and the data lines 130 intersect each other to define pixel regions P.

Common lines 109 are formed on the insulating substrate (not shown) and include the same material as the gate lines 103. The common lines 109 are parallel to and spaced apart from the gate lines 103 and pass through the pixel regions P, respectively.

A thin film transistor Tr is formed at an intersecting portion of the gate line 103 and the data line 130 in each pixel region P. The thin film transistor Tr is connected to the gate line 103 and the data line 130.

The thin film transistor Tr includes a gate electrode 105, a gate insulating layer (not shown), a semiconductor layer (not shown), and source and drain electrodes 133 and 136, which are sequentially formed. The source and drain electrodes 133 and 136 are spaced apart from each other.

In the pixel region P, outer common electrodes 116 are formed of the same material as the common lines 109. The outer common electrodes 116 extend from each common line 109 and are parallel to the data lines 130. The outer common electrodes 116 minimize effects on the pixel region P caused by the data line 130 adjacent thereto.

In the invention, the color filter layer (not shown) including red, green and blue color filter patterns (not shown) covers the thin film transistor Tr and is formed substantially over an entire display area (not shown) for displaying an image. The red, green and blue color filter patterns are sequentially repeatedly, and each color filter pattern corresponds to the pixel region P.

Although not shown in the figure, a first passivation layer (not shown) of an inorganic insulating material is formed between the color filter layer (not shown) and the thin film transistor Tr.

Here, the boundaries of each color filter pattern (not shown) are disposed on the boundaries of each pixel region P, and for example, may be disposed over the data lines 130 or the gate lines 103. A black matrix is omitted at the boundaries of the color filter pattern (not shown).

The red, green and blue color filter patterns (not shown) are sequentially repeated along the direction parallel to the gate lines 103. Along the direction parallel to the data lines 130, the red, green and blue color filter patterns (not shown) may be sequentially repeated or the same color filter patterns may be arranged. When the same color filter patterns are arranged along the direction parallel to the data line 130, the boundaries of the color filter patterns are disposed over the data lines 130.

Although not shown in the figure, a light blocking pattern is formed in a non-display area as well as peripheries of the display area and surrounds the display area. The light blocking pattern includes two or more color filter patterns, which overlap each other and each of which is formed of the same material as the red, green or blue color filter pattern of the color filter layer. The light blocking pattern functions as a black matrix for blocking light leakage in the peripheries of the display area.

Meanwhile, even though the boundaries of each color filter pattern are disposed on the boundaries of each pixel region P without an overlapping portion therebetween, the color filter patterns may overlap one adjacent thereto on the boundaries of the pixel region P.

The color filter patterns overlapping each other on the boundaries of the pixel region P can also consistently inhibit the light leakage together with an auxiliary common line 175, which correspond to the boundaries of the pixel region P.

In addition, although not shown in the figure, a second passivation layer is formed on the color filter layer and the light blocking pattern. The second passivation layer may be formed of photoacryl having a negative-type photosensitivity property.

The auxiliary common line 175 is formed on the second passivation layer and includes a vertical portion 175a and a horizontal portion 175b. The vertical portion 175a overlaps the data line 130, the outer common electrodes 116 at both sides of the data line 130, and a space between the data line 130 and each of the outer common electrodes 116. The horizontal portion 175b overlaps the gate line 103, the common line 109, and space between the gate line 103 and the common line 109.

Accordingly, the auxiliary common line 175 substantially has a lattice shape in the display area. The auxiliary common line 175 includes an opaque metallic material and corresponds to the gate line 103, the common line 109 and the data line 130. The horizontal portion 175b shields the space between the gate line 103 and the common line 109 adjacent to each other, and the vertical portion 175a shields the space between the data line 130 and the outer common electrode 116 adjacent to each other. Therefore, the auxiliary common line 175 acts as the black matrix 73 of FIG. 3 on the color filter substrate 70 of FIG. 3 of the related art IPS mode LCD device 95 of FIG. 3.

Here, since the auxiliary common line 175 is formed on the array substrate including the data line 103 and the data line 130 and the alignment margin is not needed to be considered, the auxiliary common line 175 can have a relatively narrow width compared to the black matrix 73 of FIG. 3. Accordingly, the aperture ratio of the pixel region P is increased.

In the meantime, inner common electrodes 173 having a bar shape are formed in the pixel region P and spaced apart from each other. The inner common electrodes 173 extend from the horizontal portion 175b of the auxiliary common line 175 and are parallel to the outer common electrodes 116.

The auxiliary common line 175 contacts the common line 103 or one of the outer common electrodes 116 through a common contact hole 158, which exposes the common line or the one of the outer common electrodes 116 in the pixel region P.

In the embodiment of the invention, the common contact hole 158 exposes one end of the outer common electrode 116 in the pixel region P. On the other hand, the common contact hole may be omitted as shown in FIG. 5 when the auxiliary common line 175 has the lattice structure and includes a relatively low resistivity material.

Figure 5:
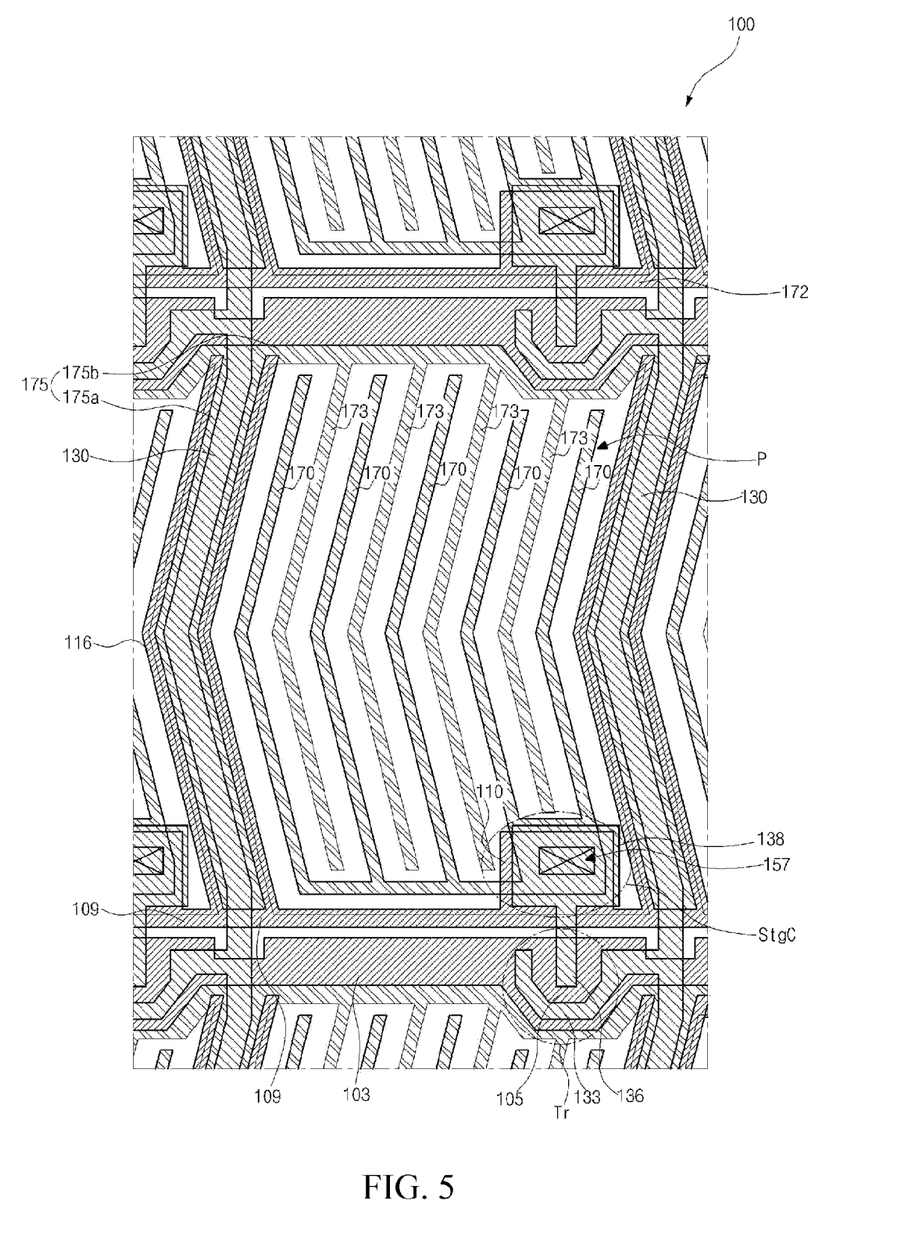
FIG. 5 is a plan view of schematic illustrating a pixel region of an IPS mode LCD device according to another example of the embodiment of the invention.

FIG. 5 is a plan view of schematic illustrating a pixel region of an IPS mode LCD device according to another example of an embodiment of the invention, and the same references will be used for the same parts as those of FIG. 4.

When the common contact is omitted in the pixel region, P the common line 109 and the auxiliary common line 175 may be electrically connected to each other in the non-display area, which is outside the display area including the pixel regions P, through an additional contact hole.

Since the auxiliary common line 175 has the lattice structure in the display area and includes a metallic material of relatively low resistivity, the difference caused by the voltage drop due to the resistances in the substantially entire display area (not shown) is similar to that of the IPS mode LCD device 100 of FIG. 4, in which the auxiliary common line 175 is connected to the common line 103 or the outer common electrodes 116 through the common contact hole 158 of FIG. 4.

Accordingly, as stated above, even though the common contact hole 158 of FIG. 4 is omitted in the pixel region P and the common line 109 is electrically connected to the auxiliary common line 175 in the non-display area (not shown), there is no problem because the difference caused by the voltage drop is similar. In this case, since the common contact hole 158 of FIG. 4 can be omitted in the pixel region, the aperture ratio of the pixel region P is further improved.

Referring to FIG. 4, a pixel pattern 169 is formed in the pixel region P of the display area AA and is connected to the drain electrode 136 of the thin film transistor Tr through a drain contact hole 157. The pixel pattern 169 overlaps the common line 109. The pixel electrodes 170 having a bar shape extend from the pixel pattern 169 and alternate the inner common electrodes 173 between the outer pixel electrodes 116.

The outer common electrodes 116, the inner common electrodes 173 and the pixel electrodes 170 are bent symmetrically with respect to an imaginary line across the center of the pixel region P and parallel to the gate line 103 and have a predetermined angle with respect to the gate line 103. The common electrodes 116 and 173 and the pixel electrodes 170 have different directional parts up and down with respect to the center of the pixel region P, thereby forming two domains. This is to prevent color shifts depending on viewing angles of the user and to improve display qualities.

Since the common electrodes 116 and 173 and the pixel electrodes 170 are bent in the pixel region P, the data line 130 is also bent symmetrically with respect to the center of the pixel region P.

Here, the data line 130 is not separated by each pixel region P and is continuously formed in the entire display area, and the data line 130 has a zigzag shape in the display area.

In the array substrate for the IPS mode LCD device 100 according to the embodiment of the invention, the common electrodes 116 and 173, the pixel electrodes 170, and the data line 130 are bent with respect to the center of the pixel region P to form two domains. However, the common electrodes 116 and 173, the pixel electrodes 170, and the data line 130 may be straight lines.

In the pixel region, P the drain electrode 136 has an extending part, which overlaps the common line 109 with a gate insulating layer (not shown) interposed therebetween. The overlapped portions of the common line 109 and the drain electrode 136 become first and second storage electrodes 110 and 138, and the first and second storage electrodes 110 and 139 and the gate insulating layer therebetween form a storage capacitor StgC.

In the IPS mode LCD device of the invention, the auxiliary common line 175, the pixel pattern 169, the inner common electrodes 173 and the pixel electrodes 170 have a double-layered structure so that the reflectance of outside light may be less than 39%.

Here, the auxiliary common line 175, the pixel pattern 169, the pixel electrodes 170 and the inner common electrodes 173 include lower layers (not shown) and upper layers (not shown). The lower layers are formed of an opaque metallic material having relative low resistivity such as molybdenum titanium (MoTi), for example. The upper layers are formed of a transparent conductive material such as indium tin oxide (ITO), indium zinc oxide (IZO) or aluminum-doped zinc oxide (AZO) or an opaque metallic material such as copper nitride (CuNx), for example.

Meanwhile, the opposite substrate (not shown) facing the array substrate (not shown) having the above-mentioned structure includes the first spacer (not shown) forming a cell cap and the second spacer (not shown) for preventing press. Each of the first and second spacers has a column shape. The first spacer is disposed in a region corresponding to borders of the pixel region P and has a first height. The second spacer is spaced apart from the first spacer and has a second height.

The first spacer and the second spacer may be formed of a transparent organic insulating material or a black resin including black pigments.

The liquid crystal layer (not shown) is interposed between the array substrate and the opposite substrate. One end of the first spacer contacts a top element of the array substrate.

Meanwhile, a seal pattern (not shown) is formed in the non-display area between the array substrate and the opposite substrate. The seal pattern surrounds the liquid crystal layer and functions as an adhesive so that the array substrate and the opposite substrate are attached to form and maintain a panel. Accordingly, the IPS mode LCD device 100 according to the embodiment of the invention is completed.

Hereinafter, a cross-sectional structure of the IPS mode LCD device according to the embodiment of the invention will be described with reference to accompanying drawings.

Figure 6:
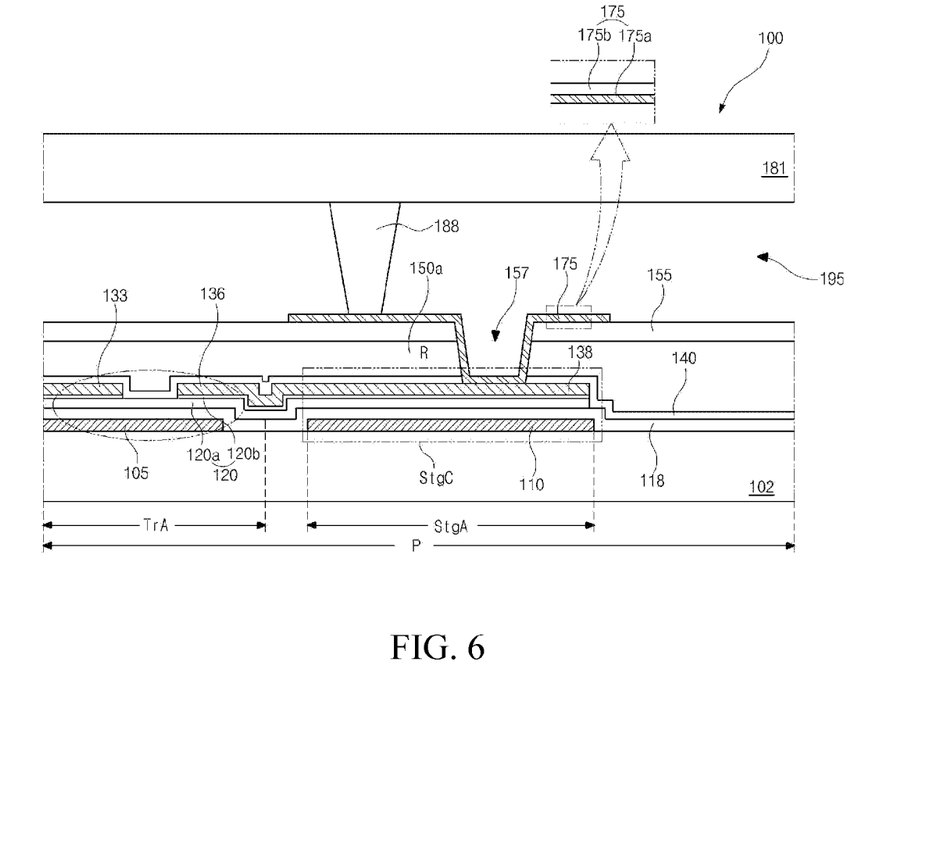
FIG. 6 is a cross-sectional view taken along the line VI-VI of FIG. 4.
Figure 7:
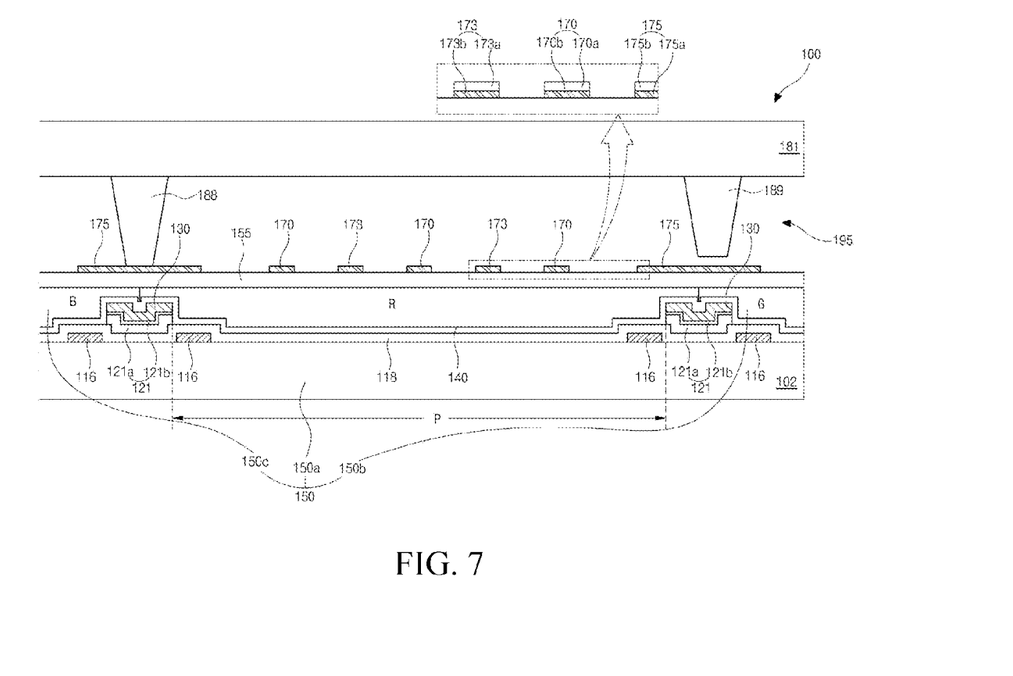
FIG. 7 is a cross-sectional view taken along the line VII-VII of FIG. 4.
Figure 8:
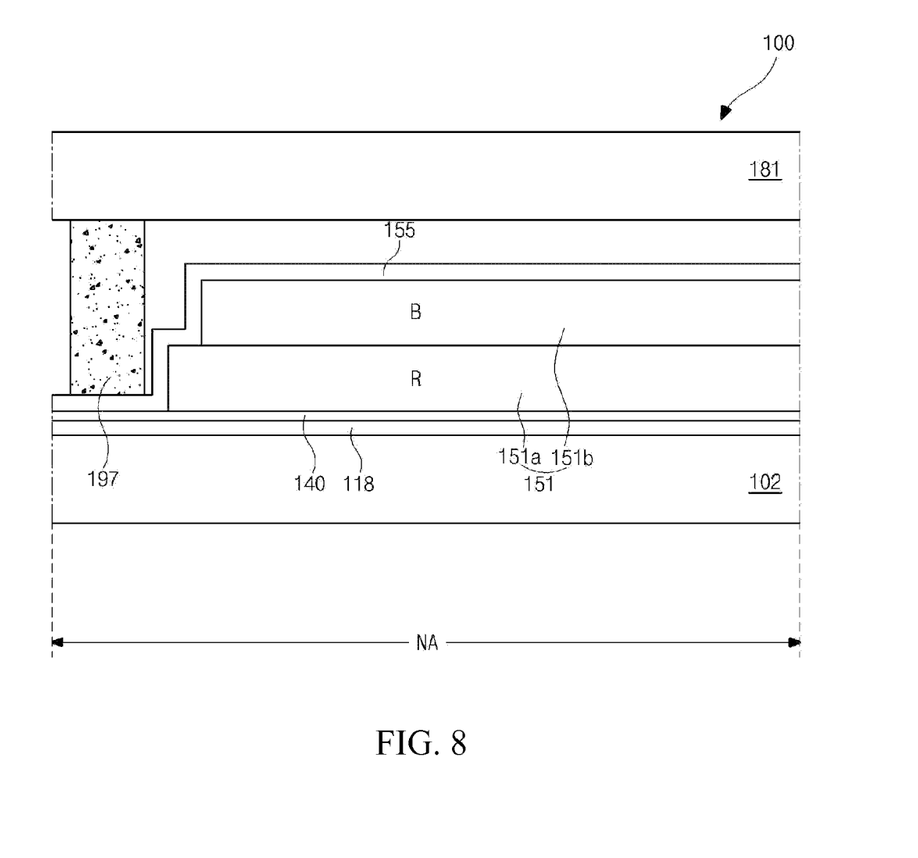
FIG. 8 is a cross-sectional view of illustrating a part of the non-display area of the IPS mode LCD device according to the embodiment of the invention.

FIG. 6 is a cross-sectional view taken along the line VI-VI of FIG. 4, FIG. 7 is a cross-sectional view taken along the line VII-VII of FIG. 4, and FIG. 8 is a cross-sectional view of illustrating a part of the non-display area of the IPS mode LCD device according to the embodiment of the invention. For convenience of explanation, a switching region TrA for the thin film transistor, and a storage region StgA for the storage capacitor StgC are defined.

As shown in the figures, the IPS mode LCD device 100 of the invention includes the array substrate 102 where pixel electrodes 170, the common electrodes 173 and the color filter layer 150 are formed, the opposite substrate 181 where the first and second spacers 188 and 189, and the liquid crystal layer 195.

On the array substrate 102, the gate line 103 of FIG. 4 is formed along a direction, and the common line 109 of FIG. 4 is spaced apart from and parallel to the gate line 103 of FIG. 4.

The gate line 103 of FIG. 4 is also disposed in the switching region TrA, and the gate line 103 of FIG. 4 in the switching region TrA functions as the gate electrode 105.

In the pixel region P, the outer common electrodes 116 extend from the common line 109 of FIG. 4 and are adjacent to the data line 130. The common line 109 in the storage region StgA has a wider width than other regions and functions as the first storage electrode 110.

The gate insulating layer 118 is formed on the gate line 103 of FIG. 4, the gate electrode 105, the common line 109 of FIG. 4 and the outer common electrodes 116. The gate insulating layer 118 is formed of an inorganic insulating material such as silicon oxide ($SiO_2$) or silicon nitride (SiNx), for example.

The semiconductor layer 120 is formed in the switching region TrA on the gate insulating layer 118. The semiconductor layer 120 includes an active layer 120a of intrinsic amorphous silicon and ohmic contact layers 120b of impurity-doped amorphous silicon. The ohmic contact layers 120b are disposed on the active layer 120a and spaced apart from each other.

The data line 130 is formed on the gate insulating layer 118 and intersects the gate line 103 of FIG. 4 to define the pixel region P. Here, a semiconductor pattern 121 is formed under the data line 130. The semiconductor pattern 121 includes first and second patterns 121a and 121b formed of the same materials as those of the semiconductor layer 120. The semiconductor pattern 121 may be omitted.

In the switching region TrA, the source electrode 133 and the drain electrode 136 are formed on the semiconductor layer 120. The source electrode 133 extends from the data line 130, and the drain electrode 136 is spaced apart from the source electrode 133. Here, the source electrode 133 and the drain electrode 136 contact the ohmic contact layers 120b, respectively.

The gate electrode 105, the gate insulating layer 118, the semiconductor layer 120, and the source and drain electrodes 133 and 136 sequentially layered in the switching region TrA constitute the thin film transistor Tr functioning as a switching element.

In the storage region StgA, the extending part of the drain electrode 136 is disposed on the gate insulating layer 118 corresponding to the first storage electrode 110 and functions as the second storage electrode 138. The first storage electrode 110, the gate insulating layer 118 and the second storage electrode 138 constitute the storage capacitor StgC.

A first passivation layer 140 is formed on the data line 130, the source and drain electrodes 133 and 136 and the second storage electrode 138 over the entire array substrate 102. The first passivation layer 140 is formed of an inorganic insulating material such as silicon oxide ($SiO_2$) or silicon nitride (SiNx), for example.

The color filter layer 150 is formed on the first passivation layer 140 in the display area AA. The color filter layer 150 includes the red, green and blue color filter patterns 150a, 150b and 150c sequentially repeated arranged. Each of the red, green and blue color filter patterns 150a, 150b and 150c corresponds to one pixel region P.

In the non-display area NA, the light blocking pattern 151 is formed on the first passivation layer 140. The light blocking pattern 151 surrounds the display area AA and includes at least two different color patterns 151a and 151b of the red, green and blue color filter patterns 151a, 151b and 151c of the color filter layer 150. The color patterns 151a and 151b overlap each other.

As shown in the figures, the light blocking pattern 151 may have a double-layered structure of red and blue patterns 151a and 151b. Alternatively, the light blocking pattern 151 may have a triple-layered structure of red, green and blue patterns.

When two or more color patterns overlap each other, the optical density becomes very high, and the light transmittance is lowered. Accordingly, by forming the light blocking pattern 151 including the double-layered or triple-layered color patterns, the light leakage can be prevented in the peripheries of the display area AA.

The light blocking pattern 151 and the auxiliary common line 175 prevent light leakage in the peripheries of the display area A and in the pixel region P, respectively.

Meanwhile, in the IPS mode LCD device 100 according to the embodiment of the invention, the color filter patterns 150a, 150b and 150c of the color filter layer 150 do not overlap each other. As another example, the color filter patterns 150a, 150b and 150c of the color filter layer 150 may overlap each other at the border of the pixel regions P adjacent to each other. The overlapped color filter patterns 150a, 150b and 150c and the auxiliary common line 175 thereon can prevent light leakage in the peripheries of the pixel region P.

The second passivation layer 155 is formed on the color filter layer 150 and the light blocking pattern 151 all over the array substrate 102. The second passivation layer 155 is formed of an organic insulating material having relatively low dielectric, for example, photo acryl to minimize parasitic capacitance caused by overlap of the data line 130 and the outer common electrodes 116 with the vertical portion 175a of the auxiliary common line 175 and to minimize effects of an electric field induced by the data line 130 and the outer common electrodes 116 adjacent thereto.

Since the photo acryl has photosensitivity, the second passivation layer 155 can be patterned to form contact holes exposing lower layers without an additional stripping step. The processes can be simplified. The photo acryl may be a negative type that a portion exposed to light remains after developing.

The drain contact hole 157 is formed in the second passivation layer 155, the color filter layer 150 and the first passivation layer 140, and the drain contact hole 157 exposes the drain electrode 136, more particularly, the second storage electrode 138. The common contact hole 158 of FIG. 4 is formed in the second passivation layer 155, the color filter layer 150, the first passivation layer 140 and the gate insulating layer 118, and the common contact hole 158 of FIG. 4 exposes one end of the outer common electrode 116.

In another example of the IPS mode LCD device 100 of FIG. 5 according to the invention, the common contact hole can be omitted.

The auxiliary common line 175 including the lower layer (not shown) and the upper layer (not shown) is formed on the second passivation layer 155 having the drain contact hole 157 and the common contact hole 158 of FIG. 4. The lower layer is formed of an opaque metallic material having relative low resistivity such as molybdenum titanium (MoTi). The upper layer is formed of a transparent conductive material such as indium tin oxide (ITO), indium zinc oxide (IZO), aluminum-doped zinc oxide (AZO) or an opaque metallic material having relatively low reflectance such as copper nitride (CuNx).

The auxiliary common line 175 is connected to the outer common electrode 116 through the common contact hole 158 of FIG. 4. Alternatively, the auxiliary common line 175 may be connected to the common line 109 of FIG. 4 in the non-display area NA outside the display area AA in the IPS mode LCD device of FIG. 5.

The auxiliary common line 175 includes the vertical portion 175a and the horizontal portion 175b. The vertical portion 175a overlaps the data line 130 and the outer common electrodes 116, and the horizontal portion 175b overlaps the gate line 103 of FIG. 4 and the common line 109 of FIG. 4. The auxiliary common line 175 has a lattice structure in the display area AA. The auxiliary common line 175 functions as a black matrix for blocking light leakage occurring in the space between the data line 130 and the outer common electrodes 116 and the space between the gate line 103 of FIG. 4 and the data line 109 of FIG. 4.

In addition, the pixel pattern 169 is formed on the second passivation layer 155 and is connected to the second storage electrode 138 of the drain electrode 136 through the drain contact hole 157.

Moreover, the inner common electrodes 173 are formed between the outer common electrodes 116 in the pixel region P on the second passivation layer 155. The inner common electrodes 173 extend from the horizontal portion 175b of the auxiliary common line 175. The inner common electrodes 173 have a double-layered structure and a bar shape.

The pixel electrodes 170 are formed between the outer common electrodes 116 in the pixel region P on the second passivation layer 155. The pixel electrodes 170 extend from the pixel pattern 169. The pixel electrodes 170 have a double-layered structure and a bar shape and alternate the inner pixel electrodes 173.

Here, the pixel electrodes 170 and the inner common electrodes 173 include the lower layers 170a and 173a and the upper layers 170b and 173b. The lower layers 170a and 173a are formed of an opaque metallic material having relative low resistivity such as molybdenum titanium (MoTi). The upper layers 170b and 173b are formed of a transparent conductive material such as indium tin oxide (ITO), indium zinc oxide (IZO), aluminum-doped zinc oxide (AZO) or an opaque metallic material having relatively low reflectance such as copper nitride (CuNx).

The reflectance of the outside light can be reduced less than 39% due to pixel electrodes 170 and the inner common electrodes 173 having the double-layered structure.

More particularly, since two material layers of a double-layered structure have predetermined thicknesses and have different refractive indexes, finally-reflected light has the lowered intensity due to an anti-reflection coating effect that lights reflected at respective material layers cause destructive interference. Therefore, the reflectance of the outside light is reduced less than 39%.

Here, if the upper layers are formed of copper nitride CuNx, there may be no anti-reflection coating effect. However, the copper nitride CuNx has relatively low reflectance, and thus the reflectance of the outer light can be less than 39%. At this time, since the copper nitride CuNx has poor contact properties with the second passivation layer 155 of photo acryl, the copper nitride CuNx may be peeled off from the second passivation layer 155. To prevent this, the lower layers of molybdenum titanium (MoTi) are formed under the upper layers of the copper nitride CuNx.

The pixel electrodes 170, the inner common electrodes 173 and the outer common electrodes 116 may have a straight bar shape or may have a bent bar shape symmetrical with respect to the center of each pixel region P.

When the pixel electrodes 170, the inner common electrodes 173 and the outer common electrodes 116 are bent symmetrically with respect to the center of the pixel region P, two domains are formed in the pixel region P. This prevents color shifts depending on the viewing angles of the user.

Meanwhile, the first spacer 188 forming a cell cap and the second spacer 189 for preventing press are formed on the opposite substrate 181 facing the array substrate 102 having the above-mentioned structure. Each of the first and second spacers 188 and 189 has a column shape. The first spacer 188 is disposed in a region corresponding to the borders of the pixel region P and has the first height. The second spacer 189 is spaced apart from the first spacer 189 and has the second height. The first height is higher than the second height.

The first spacer and the second spacer may be formed of a transparent organic insulating material or a black resin including black pigments. One end of the first spacer 188 contacts a top element of the array substrate 102.

A seal pattern 197 is formed in the non-display area NA between the array substrate 102 and the opposite substrate 181. The seal pattern 197 surrounds the liquid crystal layer 195 and functions as an adhesive so that the array substrate 102 and the opposite substrate 197 are attached to form and maintain a panel. Accordingly, the IPS mode LCD device 100 according to the embodiment of the invention is completed.

The IPS mode LCD device 100 according to the embodiment of the invention does not include the black matrix designed considering the alignment margin. Thus, the aperture ratio is increased, and the mask processes are reduced. Moreover, since the overcoat layer is also omitted, the material costs are decreased, and the manufacturing costs can be lowered.

The facilities for the black matrix are not needed, and the initial installation costs can be decreased.

Since the second passivation layer 155 is formed of photo acryl having negative photosensitivity, the stripping step is not necessary after forming the contact holes. Therefore, the processes are simplified.

The inner common electrodes 173 and the pixel electrodes 170 parallel to the data line 130 are bent symmetrically with respect to the center of the pixel region P, and the two domains are formed in the pixel region P. Accordingly, the color shifts due to the viewing angles can be prevented.

The inner common electrodes 173 and the pixel electrodes 170 have the double-layered structure of the opaque metallic material and the transparent conductive material or the opaque metallic material and copper nitride (CuNx), and the reflectance of the outside light is reduced less than 39%. Thus, rainbow spots are not generated, and the ambient contrast ratio is improved.

Like this, in the IPS mode LCD device, the black matrix is omitted, and the color filter layer is formed on the array substrate. The light leakage is effectively prevented, and the aperture ratio is increased.

The distance from the data line to the pixel electrodes and the inner common electrodes is increased, and the passivation layer is formed of photo acryl having relatively low resistivity. The effects from the metallic materials adjacent to the data line are minimized, and the display qualities are improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing each other, wherein a display area and a non-display area are defined on the first and second substrates, and a liquid crystal layer is interposed between the first and second substrates;
   a gate line, a data line and a common line over an inner surface of the first substrate in the display area, wherein the gate line and the data line intersect each other to define a pixel region, and the common line is parallel to the gate line;
   a thin film transistor at the pixel region and connected to the gate line and the data line;
   a color filter layer over the thin film transistor all over the display area;
   a first passivation layer of photo acryl over the color filter layer;
   an auxiliary common line, inner common electrodes and pixel electrodes over the first passivation layer, wherein the auxiliary common line includes a vertical portion overlapping the data line and a horizontal portion overlapping the gate line and the common line and has a lattice structure, the inner common electrodes extend from the horizontal portion in the pixel region and have a bar shape, and the pixel electrodes alternate the inner common electrodes and have a bar shape, the auxiliary common line forming a light shielding pattern in a periphery of the pixel region and interconnecting a plurality of the inner common electrodes of an individual pixel region;
   outer common electrodes for the individual pixel region formed on the first substrate, the outer common electrodes connected to the auxiliary common line in a region where the vertical and horizontal portions of the auxiliary common line intersect; and
   a light blocking pattern in the non-display area and surrounding the display area, wherein the light blocking pattern includes the same materials as the color filter layer.

2. The device according to claim 1, further comprising:
   a second passivation layer between the thin film transistor and the color filter layer over the entire first substrate, wherein the second passivation layer is formed of an inorganic insulating material.

3. The device according to claim 2, wherein the color filter layer includes red, green and blue color filter patterns sequentially repeated, and a border of each color filter pattern is disposed over a border of the pixel region.

4. The device according to claim 3, wherein adjacent two of the red, green and blue color filter patterns overlap each other over the border of the pixel region.

5. The device according to claim 3, wherein the light blocking pattern includes at least two color patterns that are made of the same materials as two of the red, green and blue color filter patterns, and the color patterns of the light blocking pattern overlap each other.

6. The device according to claim 5, wherein the outer common electrodes extend from the common line and are parallel to the data line in the pixel region on the first substrate, wherein the vertical portion of the auxiliary common line overlaps the outer common electrodes to shield a space between the data line and the outer common electrodes.

7. The device according to claim 6, wherein the first passivation layer, the color filter layer and the second passivation layer includes a drain contact hole exposing a drain electrode of the thin film transistor and a common contact hole exposing one of the outer common electrodes, the pixel electrode contacts the drain electrode of the thin film transistor through the drain contact hole, and the auxiliary common line contacts the one of the outer common electrodes through the common contact hole.

8. The device according to claim 6, wherein the first passivation layer, the color filter layer and the second passivation layer includes a drain contact hole exposing a drain electrode of the thin film transistor, the pixel electrode contacts the drain electrode of the thin film transistor through the drain contact hole, and the auxiliary common line and the common line contact each other in the non-display area.

9. The device according to claim 1, further comprising a pixel pattern in the pixel region over the first passivation layer, wherein the pixel pattern connects ends of the pixel electrodes.

10. The device according to claim 1, wherein each of the auxiliary common line, the pixel electrodes, the inner common electrodes includes a lower layer of an opaque metallic material and an upper layer of a transparent conductive material or copper nitride.

11. The device according to claim 10, wherein the transparent conductive material is one of indium tin oxide, indium zinc oxide and aluminum-doped zinc oxide.

12. The device according to claim 1, wherein the common line includes a first storage electrode overlapping a second storage electrode of a drain electrode of the thin film transistor, and the first storage electrode, the second storage electrode and a gate insulating layer therebetween form a storage capacitor.

13. The device according to claim 1, further comprising:
a first spacer over an inner surface of the second substrate, the first spacer corresponding to a border of the pixel region and having a first height; and
a second spacer over the inner surface of the second substrate, the second spacer spaced apart from the first spacer and having a second height lower than the first height.

14. The device according to claim 1, wherein the outer common electrodes extend from the common line and are parallel to the data line in the pixel region on the first substrate, wherein the data line, the pixel electrodes, the outer common electrodes and the inner common electrodes are bent symmetrically with respect to a center of the pixel region, and there are two domains in the pixel region.

15. The device according to claim 1, wherein:
the auxiliary common line extends across a plurality of pixel regions, the plurality of the inner common electrodes of an individual pixel region and a plurality of inner common electrodes of an adjacent pixel region extending from the same auxiliary common line;
the outer common electrodes for the individual pixel region are formed parallel to the inner common electrodes and extend from the common line from a side of the pixel region opposite to a side where the inner common electrodes are interconnected by the auxiliary common line; and
the outer common electrodes are connected to the auxiliary common line in the region of the auxiliary common line that interconnects the plurality of the inner common electrodes of the individual pixel region with the plurality of inner common electrodes of the adjacent pixel region.

* * * * *